April 11, 1967    A. S. NICHOLAS    3,313,574
RECEIVER FOR BELT RETRACTORS
Original Filed July 9, 1964    2 Sheets-Sheet 1

INVENTOR.
ARTHUR S. NICHOLAS

BY

ATTORNEYS

April 11, 1967   A. S. NICHOLAS   3,313,574
RECEIVER FOR BELT RETRACTORS
Original Filed July 9, 1964   2 Sheets-Sheet 2
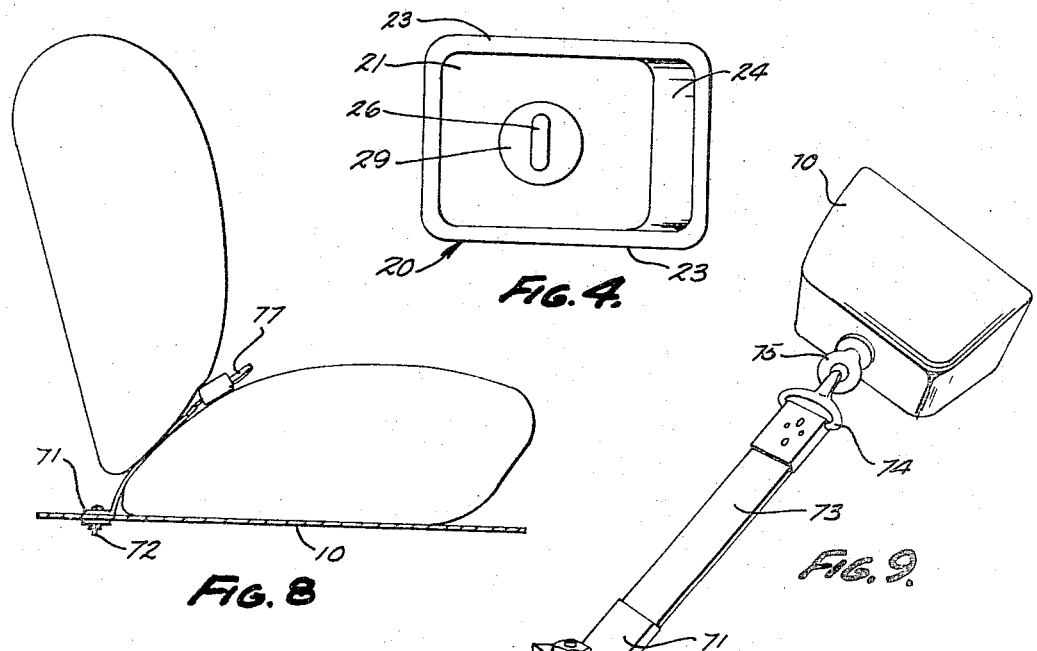
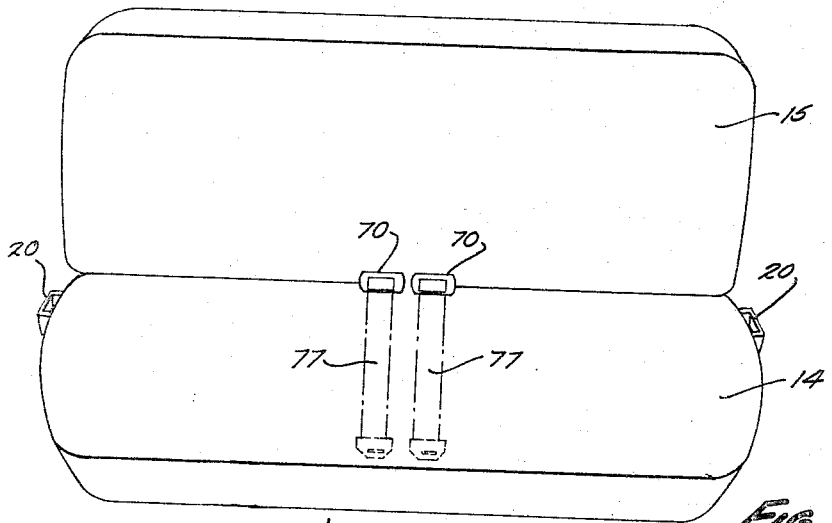
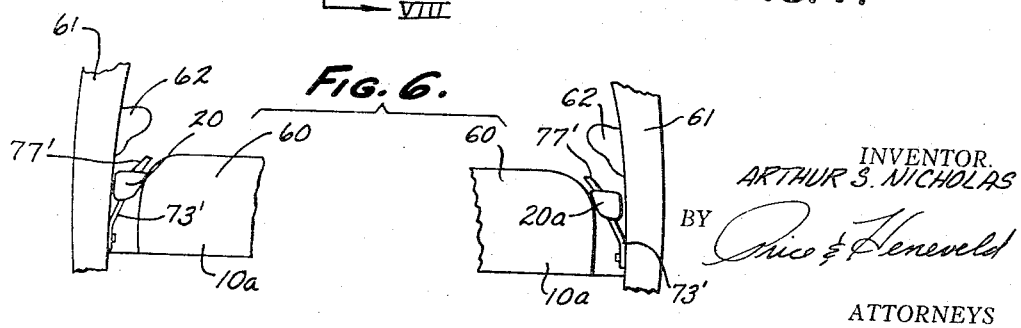
INVENTOR.
ARTHUR S. NICHOLAS
BY
ATTORNEYS United States Patent Office 3,313,574
Patented Apr. 11, 1967

3,313,574
RECEIVER FOR BELT RETRACTORS
Arthur S. Nicholas, 915 Carrier Creek Blvd.,
Grand Rapids, Mich. 49503
Original application July 9, 1964, Ser. No. 381,463, now Patent No. 3,272,557, dated Sept. 13, 1966. Divided and this application Oct. 6, 1965, Ser. No. 510,133
4 Claims. (Cl. 297—388)

This application is a divisional application of the parent application entitled, Receiver to Belt Retractors, filed July 9, 1964, Ser. No. 381,463, now Patent No. 3,272,557 by Arthur S. Nicholas.

This invention relates to automotive accessories, and particularly to a holder-receiver for safety belts.

This application is a continuation-in-part of my copending application, Ser. No. 344,727 entitled Receiver for Seat Belt Retractor, filed Feb. 13, 1964, now Patent No. 3,171,688. In that application, I disclosed a receiver suitable for automobiles in which the seats are either on a level floor, or the level of the seat itself is substantially raised above the floor at the immediate sides of the seat. This invention is directed to a receiver for seat belts and the retractors therefor, suitable for cars in which the floor is deeply recessed, whereby the sides of the floor between the seat and the door are raised almost to the level of the seat surface. It is also useful for those vehicles in which bucket-type seats are utilized which are of low silhouette, and therefore, almost on the floor.

This type of automotive construction presents some specialized problems not present in the more conventional seating constructions. Among other things, the end of the seat belt and its retractor, in stored position, are exposed at the side of the seat. Unless some type of neat housing is provided for the belt and retractor, this arrangement is unattractive and unsightly. Further, it is in the path of entry and exit from the vehicle, making it subject to scuffing, physical damage and the accumulation of dirt from the passengers' feet as they move in and out of the car. This dirt will become embedded in the belt fabric. Ultimately, the belt becomes so dirty that it cannot be used without serious damage to clothing. This is particularly true if oil, grease or road tar contacts the belt. Unfortunately, these are common substances around automobiles.

Another problem is that so little space is available that whatever storage unit is provided must be compact. Otherwise, it will become a serious interference to entering and leaving the car. Since it is located in the path of entrance and exit, the material used for the storage unit must be such that it will not mark, scuff, rip or otherwise, damage clothes and shoes.

This invention places the end of the seat belt where it is convenient to the rider to pull it up and secure it. Quite frequently, seat belts are not used even though they are available in the vehicle. This is often due to the fact that they are difficult to grasp or become entangled in the understructure of the seat. Rather than take the time to untangle them, the rider simply ignores them and drives off. Therefore, this invention contributes materially to encouraging the proper use of seat belts.

Another facet of this invention provides an inexpensive, neat and simple way of protecting the fabric or plastic covers of the seats and back cushions where belts have to pass through to the rearward anchor mechanism. This is an area of considerable wear if the belt is attached to the anchor mechanism at this point. If the belt is carried through the seat-back joint and down to the floor, the lower end of the belt is subject to suffing and damage. Further, should it be kicked by a rear seat passenger, it may be withdrawn from the front seat entirely. This again, materially contributes to the lack of use of seat belts, even though they are available. This invention solves these problems.

These and other objects and advantages of this invention will be understood by those acquainted with safety belt engineering upon reading the following specification and the accompanying drawings.

In the drawings:

FIG. 4 is a plan view of the receptacle illustrated in FIG. 3;

FIG. 6 is a fragmentary, somewhat schematic, front elevation view of the application of this invention to the rear seat of an automobile;

FIG. 7 is an oblique view of the front of an automotive seat equipped with this invention;

FIG. 8 is a fragmentary central section view taken along the plane VIII—VIII of FIG. 7;

FIG. 9 is an oblique view of the seat belt holder illustrated in FIGS. 7 and 8.

Throughout the following description, it will be understood that safety belts are of two piece construction. One end of both pieces are anchored to the vehicle. The other end of one piece is equipped with a buckle and the other end with a complementary keeper plate designed to cooperate and lock with the buckle. The term "buckle" is used throughout this application. However, it is to be understood that this only for simplicity of description because this invention is equally applicable to both the buckle and the keeper plate and to this extent, these parts are to be considered interchangeable.

In executing this invention, there is provided a semi-rigid cup into which the end of the seat belt is received, and within which it is secured to its anchor structure. In one form of the invention, the seat belt is entirely retracted into the cup when it is in storage. In the other form of the invention, there is no retractor on the seat belt, but the attachment means by which it is secured to the vehicle body is concealed and protected within the cup.

Figure 1:
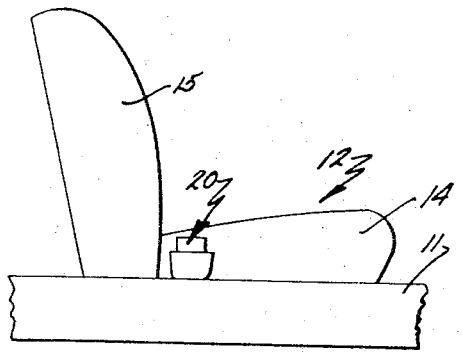
FIG. 1 is a somewhat schematic side elevation view of a seat showing the invention.
Figure 2:
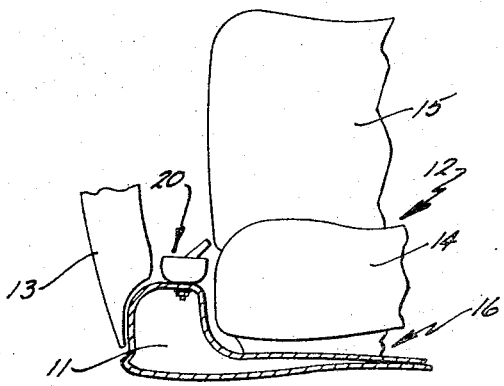
FIG. 2 is a fragmentary front eleveation view of the invention located adjacent the seat.

Referring specifically to the drawings and to FIG. 2, the numeral 10 indicates the floor of a vehicle body. The floor has an upstanding ridge between the seat 12 and the door 13. The seat cushion of the seat is indicated by the numeral 14 and the back cushion by the numeral 15. It will be noted that by reason of the ridge, the floor is deeply recessed to form a well 16 in which the seat is located, thus placing the top surface of the seat cushion 14 only a few inches above the top of the ridge 11. The safety belt receiver 20 of this invention is shown mounted on the top of this ridge at the side of the seat.

Figure 3:
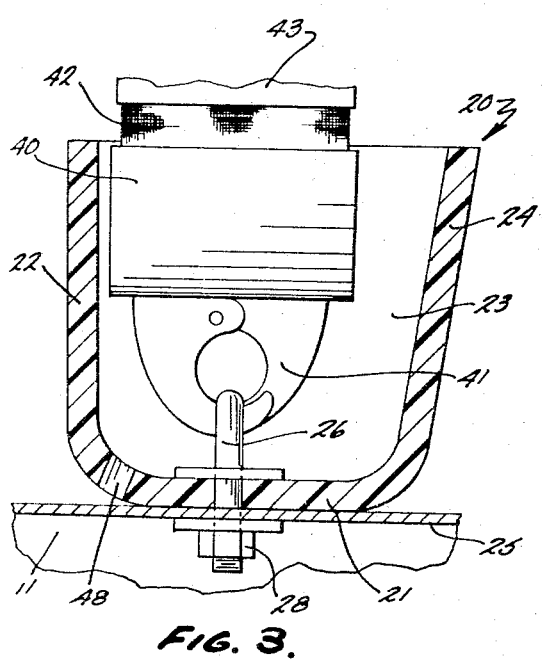
FIG. 3 is an enlarged central elevational section of the invention, with the section taken on a front to rear plane.

As more specifically seen in FIGS. 3 and 4, the receptacle 20 is cup-shaped, having a bottom 21, a rear wall 22, side walls 23 and an inclined front wall 24. The top of the cup-shaped body is open to receive the belt structure. The bottom 21 of the receiver seats down firmly against the body structure 25 formed by the top of the ridge 11. The anchor bolt 26 for the safety belt extends down through the bottom wall 21 and the body panel 25 and is firmly secured to the vehicle body by the nut and washer combination 28. The upper end of the anchor bolt 26 has a washer 29 which bears against the inside surface of the bottom 21 to limit downward movement of the bolt and to firmly secure the receptacle.

Shown within the receptacle 20 is a safety belt retractor 40 which has a depending ear 41 secured to the upper end of the anchor bolt 26. Extending upwardly from the retractor is the web 42 of the safety belt. To the end of this web is attached a conventional buckle 43. As illustrated in FIG. 3, the safety belt is fully retracted. It will be seen that both the safety belt and the retractor are contained into the recepacle when in storage. A portion of the buckle projects beyond the top of the receptacle 20 so that it may be readily grasped by a rider and pulled out or extended.

The retractor may be one which travels with the belt, or it may be one which is permanently secured to the ear 41 and thereby remains stationary within the receptacle. If it travels with the safety belt, it will not be directly connected to the ear 41 since a length of belt will be located between the retractor and the ear. In either case, it is a spring loaded, automatic retraction mechanism, operative upon release of the end of the belt. A number of these are available on the market and the particular construction of the retractor itself is not a part of this invention. The height of the receptacle 20 is such that it holds the top of the buckle just below the level of the seat where it will be easy to grasp, but still so placed that it does not interfere with the movement of people in and out of the car.

The receptacle is molded of a material of sufficient stiffness that it can support its own weight, and also will hold the weight of the buckle in a convenient position to be grasped when required. A preferred material is a semi-rigid, synthetic resin as for example, a molded vinyl resin having a reasonably heavy wall thickness. This type of material is desirable because it can be provided with a neat and attractive appearance. It can be made in any color to blend with the decor of the vehicle's interior. It is rigid enough to support the buckle and the retractor, yet has sufficient give that should it be kicked, it will flex and return to its original shape without mark or injury. The vinyl resins are highly resistant to scuffing, moisture and to soiling. Thus, it is durable and will retain its attractive appearance over a substantial life span. It will also be recognized that there are synthetic resinous materials other than vinyls which will meet these specifications.

It is also important that the receptacle be somewhat flexible in the event a passenger when seating himself in the vehicle should seat himself too far over and sit partially on the retracted belt and its holding mechanism. If this mechanism is rigid, the passenger could suffer significant injury as well as perhaps damaging his clothing. However, using a material having sufficient flexibility to give in circumstances such as this, this danger is eliminated because the receptacle will permit the receptacle and the safety belt mechanism to flex downwardly or sideways without sufficient resistance to cause injury or difficulty for the passenger.

To locate the receptacle most conveniently, where the direction of pull on the safety belt will be most effective in an emergency, and as far as possible out of the way of people entering and leaving the vehicle, it is located adjacent the rear of the seat cushion. It may even be located to the side of the back cushion. In either case, the belt will be drawn forwardly as well as upwardly when it is extended. To permit this, the forward wall 24 of the storage cup is inclined to provide clearance for this movement of the belt. There will thus be no interference or rubbing action between the belt or retractor and the surface of the storage cup. In the event the vehicle door 13 is inadvertently left open, and rain should enter the vehicle, the cup is provided at the bottom with a small drain opening 48 to permit this moisture to escape and prevent its accumulation in the receptacle.

Figure 5:
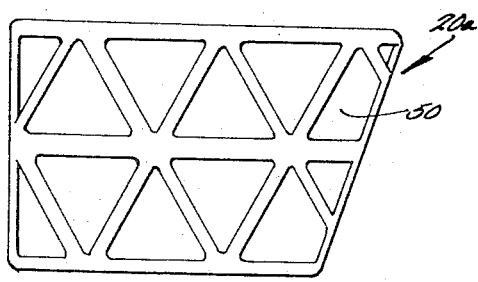
FIG. 5 is a side elevation view of a modified construction for this invention.

FIG. 5 shows a modification of the receptacle. In this construction, the receptacle 20a instead of having solid sides, is molded with openings 50 through its sides, whereby its structure is more in the nature of a basket than of an enclosed retainer. The removal of material is such that the receptacle retains the necessary strength to support the retractor and the buckle, but sufficiently open that any dirt or moisture which might enter it will escape through its sides.

It will be understood that in the conventional vehicle, a pair of receptacles 20 and 20a are provided, one on each side of the vehicle. In some vehicles, where there is sufficient clearance in the rear seat between the side panel and the rear seat cushion, such a cup may be provided on each side of the rear seat to receive the seat belt. This would be a convenience which has never before been provided in a vehicle. Such an arrangement is illustrated in FIG. 6 in which the rear seat cushion is indicated by the number 60, the adjacent side panel of the vehicle is indicated by the number 61 and the arm rest conventionally provided at the rear seat is indicated by the numeral 62. The receptacle 20 is shown squeezed between the panel 61 and the rear seat cushion. In order to account for the extra distance between the cup and the floor 10a of the vehicle, an anchor strap 73', similar to that illustrated in FIG. 9 may be used to secure both the receptacle and the end of the belt 77'.

FIGS. 7 through 10 illustrate the other form of this invention. In this form of the invention, the receptacle 70 is used with a vehicle seat of the type that is continuous from one side of the vehicle to the other. It is located in the joint between the seat cushion and back cushion. It is utilized to secure the second portion of the conventional two portion vehicle safety belt. Since safety requirements permit a retractor on only one portion of each seat belt, the receptacle 70 will be considerably thinner than the receptacle 20 because it does not have to receive a retractor. It is elongated in the direction of the seat cushion joint and flattened in the opposite direction whereby it seats snugly down into this joint where it will not interfere with the passengers and is largely concealed. This is illustrated in FIGS. 7 and 8.

Figure 10:
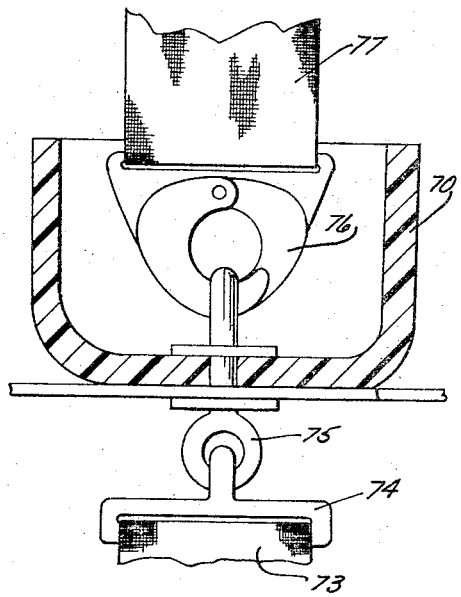
FIG. 10 is a fragmentary central sectional view of the receptacle illustrated in FIG. 9.

To mount this invention, an anchor plate 71 is secured to the floor 10 of the vehicle by suitable means such as a bolt 72 (FIGS. 8 and 9). To this is attached a high strength, flexible strap 73 which in turn terminates in a fitting 74. The fitting 74 is secured to the anchor bolt 75 which passes through the bottom of the receptacle 70. The sister hook fitting 76 at the end of the belt 77 is secured to the inner end of the anchor bolt 75 (FIG. 10). It will be noted that the sister hook structure, the end of the belt and the end of the bolt to which the sister hook is secured are all confined within the receptacle with only the flexible web 77 of the belt extending forwardly out of the receptacle. Thus, the receptacle conceals this anchor structure and shields it from the structure of the fabric surface of the cushion. Thus, the constant movement incident to usage will not permit these metallic parts to rub on the cushions and wear them. Furthermore, the receptacle neatly conceals this structure, materially improving the appearance of the vehicle.

In addition, the presence of the receptacle forms a resilient protective layer over these rigid metallic parts so that there will be no unpleasant contact between the passenger and the equipment. At the same time, the receptacle does not interfere with the proper function of the safety belt because it permits the load imposed upon the safety belt to pass directly to the strap and thus to the anchor bolt. This arrangement solves some of the undesirable facets of present seat belt structures, and thus encourages their use. It will be understood that the arrangement shown in FIGS. 7 through 10 is equally applicable to a rear as well as a front vehicle seat. It contributes to the solution to problems which have been becoming evident as vehicle safety belts have come into more general usage, and therefore, have been applied to various vehicle structures which are not particularly adapted to their incorporation.

While preferred embodiments of this invention have been disclosed, it will be understood that some modifications of these embodiments may be made within the principles of the invention. Such of these modifications as are within the principles of the invention are to be considered as covered by the hereinafter appended claims unless these claims by their language expressly state otherwise.

I claim:

1. In combination with an automotive vehicle having a seat extending from one side of said vehicle to the other, a floor and a personnel retaining safety belt having a portion at the center of said seat, said seat having both a seat and a back cushion, an anchor for said portion of said safety belts comprising: an anchor strap having one end secured to said vehicle floor and the other end extending between said seat and back cushions; a terminal receptacle of flexible semi-rigid material having an open forward end, said terminal receptacle being secured to said anchor strap; one end of said portion of said safety belt being secured to said anchor strap within said terminal receptacle; said terminal receptacle being nestled between said seat and said back cushions with only the open forward end thereof exposed.

2. In combination with an automotive vehicle having doors and a seat and personnel retaining safety belts, said vehicle having a rear seat and body structure including a side panel on each side thereof, a safety belt receiving means comprising: a cup-shaped receptacle having side walls and a bottom wall, the top thereof being open; an anchor member having one end within said receptacle and extending through the bottom of said receptacle and means securing it to said body structure adjacent the sides of said rear seat; a spring loaded retractor on said safety belt receivable within said receptacle, one end of said safety belt being secured to said anchor member; said safety belt and said retractor being received within said receptacle except for the end portion thereof when said safety belt is retracted, said receptacle being of a flexible material of sufficient rigidity to support the weight of said retractor and belt, said receptacle being received between said side panel and said rear seat and embedded between them sufficiently that only the open top thereof is exposed.

3. In combination with an automotive vehicle having a body and a seat, a personnel safety belt assembly comprising: a first belt portion including an anchor strap, and a second belt portion, said anchor strap having a lower end secured to said vehicle body and an upper end projecting up adjacent said seat; a cup shaped receptacle having closure walls and one open wall; said anchor strap upper end projecting through said one closure wall opposite said open wall, into said receptacle, and said receptacle being secured to said anchor strap upper end; said first belt portion having one end secured to said anchor strap upper end within said receptacle; and said receptacle being of a flexible semi-rigid material.

4. The combination in claim 3 wherein said first belt portion has a spring loaded retractor thereon receivable within said receptacle; and said flexible receptacle is of sufficient rigidity to support the weight of said retractor and said first belt portion.

References Cited by the Examiner

UNITED STATES PATENTS

| | | | |
|---|---|---|---|
| 2,855,028 | 10/1958 | Matthews | 297—388 |
| 2,964,100 | 12/1960 | McCall | 297—388 |
| 3,046,056 | 7/1962 | Greene et al. | 297—385 |
| 3,126,228 | 3/1964 | Greene et al. | 297—385 |
| 3,171,688 | 3/1965 | Nicholas | 297—388 |
| 3,249,386 | 5/1966 | Broad et al. | 297—388 |

FRANK B. SHERRY, *Primary Examiner.*

CASMIR A. NUNBERG, *Examiner.*